United States Patent
Kikuchi et al.

(10) Patent No.: US 10,147,016 B2
(45) Date of Patent: Dec. 4, 2018

(54) IMAGE PROCESSING APPARATUS TO ENCODE IMAGE DATA BY IMAGE PROCESSING PARAMETERS

(71) Applicant: CANON KABUSHIKI KAISHA, Tokyo (JP)

(72) Inventors: Akemi Kikuchi, Kawasaki (JP); Yoshinobu Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 14/799,469

(22) Filed: Jul. 14, 2015

(65) Prior Publication Data

US 2016/0028982 A1 Jan. 28, 2016

(30) Foreign Application Priority Data

Jul. 23, 2014 (JP) .................. 2014-149918

(51) Int. Cl.
| | | |
|---|---|---|
| *G06K 9/62* | (2006.01) | |
| *H04N 19/17* | (2014.01) | |
| *H04N 19/15* | (2014.01) | |
| *H04N 19/13* | (2014.01) | |
| *H04N 5/77* | (2006.01) | |
| *H04N 9/804* | (2006.01) | |
| *G06K 9/46* | (2006.01) | |

(52) U.S. Cl.
CPC .......... *G06K 9/6201* (2013.01); *G06K 9/46* (2013.01); *H04N 5/772* (2013.01); *H04N 9/8047* (2013.01); *H04N 19/13* (2014.11); *H04N 19/15* (2014.11); *H04N 19/17* (2014.11); *G06K 2009/4666* (2013.01)

(58) Field of Classification Search
CPC .................. G06K 9/6201; G06K 9/46; G06K 2009/4666; H04N 19/15; H04N 19/17; H04N 19/13; H04N 5/772; H04N 9/8047; H04N 19/91; G06T 9/00
See application file for complete search history.

(56) References Cited

U.S. PATENT DOCUMENTS

| | | | | |
|---|---|---|---|---|
| 5,767,898 | A * | 6/1998 | Urano | G06T 9/007 |
| | | | | 348/43 |
| 2004/0027463 | A1* | 2/2004 | Kawamura | H04N 1/2112 |
| | | | | 348/222.1 |
| 2014/0133568 | A1* | 5/2014 | Otsuka | H04N 19/513 |
| | | | | 375/240.16 |

FOREIGN PATENT DOCUMENTS

| | | | |
|---|---|---|---|
| JP | 2000125295 | A | 4/2000 |
| JP | 2003069951 | A | 3/2003 |
| JP | 4100836 | B2 | 6/2008 |
| JP | 2009027693 | A | 2/2009 |
| JP | 2009130864 | * | 6/2009 |
| JP | 2013168867 | A | 8/2013 |

* cited by examiner

*Primary Examiner* — Albert H Cutler
(74) *Attorney, Agent, or Firm* — Canon U.S.A., Inc. IP Division (57) ABSTRACT

An image processing apparatus includes a processing unit that image-processes a plurality of image data using different parameters, a comparison unit that compares image processing results, and a determination unit that determines, from the plurality of parameters, a parameter based on a comparison result by the comparison unit, in which image data is processed using the parameter determined by the determination unit.

12 Claims, 8 Drawing Sheets

| | T0 | T1 | T2 | T3 | T4 | T5 |
|---|---|---|---|---|---|---|
| IMAGE DATA 1 TABLE TO BE USED | TABLE 1 | TABLE 1 | TABLE 1 | TABLE 3 | TABLE 3 | TABLE 1 |
| IMAGE DATA 2 TABLE TO BE USED | TABLE 2 | TABLE 3 | TABLE 3 | TABLE 2 | TABLE 1 | TABLE 3 |
| IMAGE DATA 3 TABLE TO BE USED | TABLE 1 | TABLE 3 | TABLE 3 | TABLE 2 | TABLE 1 | TABLE 1 |
| TABLE 1 COUNT VALUE | 0→1 | 1 | 1 | 1 | 1→2 | 2→3 |
| TABLE 2 COUNT VALUE | 0 | 0 | 0 | 0→1 | 1 | 1 |
| TABLE 3 COUNT VALUE | 0 | 0→1 | 1→2 | 2 | 2 | 2 |

FIG. 7E

IMAGE PROCESSING APPARATUS TO ENCODE IMAGE DATA BY IMAGE PROCESSING PARAMETERS

BACKGROUND

Field

Aspects of the present invention generally relate to an image processing apparatus that processes image data.

Description of the Related Art

When an image or any input data is processed, a technique for image-processing each data piece using an image processing parameter has been known.

For example, Japanese Patent No. 4100836 discusses a method for encoding image data using a plurality of Huffman tables. By this technique, the Huffman table appropriate for input data can be selected, and the data size of data to be encoded can be suppressed.

However, in the conventional technique, when plural kinds of image data are acquired, each kind of the image data is image-processed using the corresponding image processing parameter. Therefore, the number of times of image processing may increase, and it may take time to perform the image processing.

SUMMARY

Aspects of the present invention are generally directed to appropriately image-processing a plurality of image data.

According to an aspect of the present invention, an image processing apparatus that encodes image data includes a storage unit configured to store a plurality of image processing parameters, a first processing unit configured to image-process a plurality of first image data using different image processing parameters, a comparison unit configured to compare processing results of the plurality of first image data processed by the first processing unit, a determination unit configured to determine, from the plurality of image processing parameters, an image processing parameter based on a comparison result by the comparison unit, and a second processing unit configured to image-process second image data using the image processing parameter determined by the determination unit.

Further features of the present disclosure will become apparent from the following description of exemplary embodiments with reference to the attached drawings.

DESCRIPTION OF THE EMBODIMENTS

Exemplary embodiments will be described below with reference to the drawings. Configurations illustrated in the exemplary embodiments are only examples are not seen to be limiting.

Figure 1:
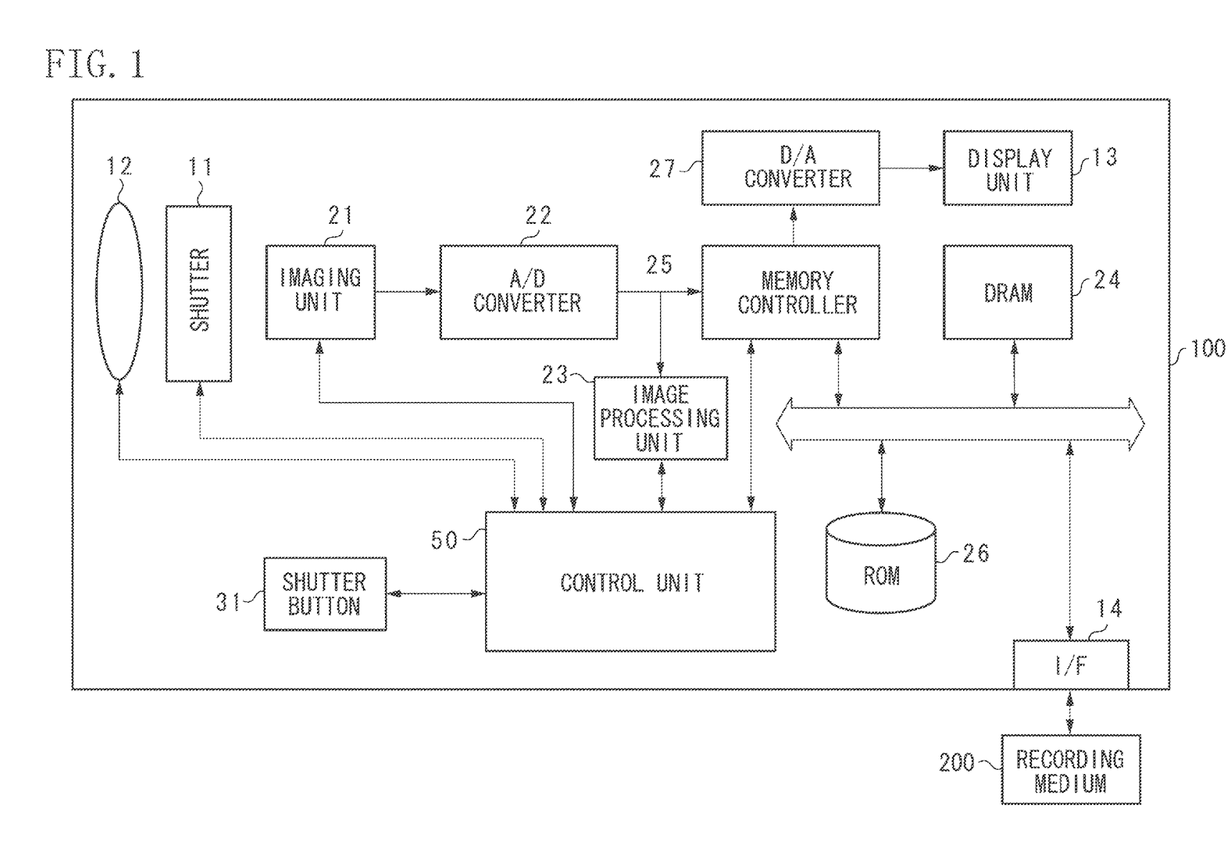
FIG. 1 illustrates a configuration of an image processing apparatus according to a first exemplary embodiment.

A first exemplary embodiment will be described. FIG. 1 illustrates a configuration of a digital camera 100 according to the exemplary embodiment. The digital camera 100 according to the present exemplary embodiment is an example of an imaging apparatus or an image processing apparatus. The digital camera 100 includes a shutter 11, an imaging lens 12, a display unit 13, an interface (I/F) to a recording medium 200, an imaging unit 21, an analog-to-digital (A/D) converter 22, an image processing unit 23, a dynamic random access memory (DRAM) 24, a memory controller 25, a read-only memory (ROM) 26, a digital-to-analog (D/A) converter 27, a shutter button 31, and a control unit 50.

The control unit 50 includes a central processing unit (CPU), for example, and executes a program stored in the ROM 26 or the DRAM 24, described below. More specifically, the control unit 50 corresponds to a control unit that controls the entire digital camera 100. The ROM 26 and the DRAM 24 are used as various storage areas of data such as a storage area of a program to be mainly executed by the control unit 50, a work area during the execution of the program, and a storage area of image data to be generated by the imaging unit 21, described below. The ROM 26 and the DRAM 24 store parameters used for various types of processing in each of blocks within the digital camera 100 and parameters set from a user and the like. The parameters include image processing parameters to be used for image processing of the image processing unit 23.

Figure 2A:
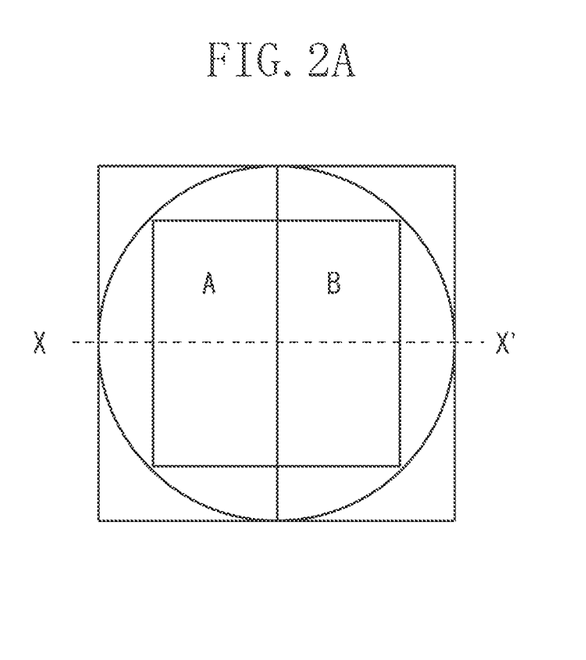
FIGS. 2A and 2B illustrate a configuration of a unit pixel in an imaging unit in the image processing apparatus according to the first exemplary embodiment.
Figure 2B:
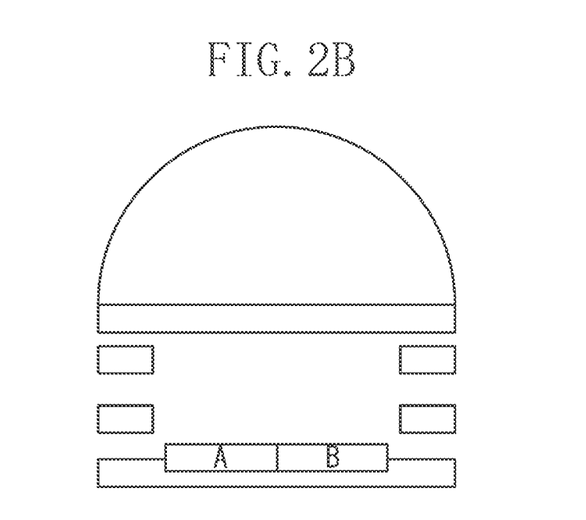

FIGS. 2A and 2B illustrate an example of a configuration of a unit pixel in an image sensor such as a charge coupled device (CCD) or a complementary metal oxide semiconductor (CMOS) (not illustrated) included in the imaging unit 21. FIG. 2A illustrates an image as viewed from the imaging lens 12, and FIG. 2B illustrates an image of a cross section taken along a dotted line (X-X') illustrated in FIG. 2A. In the image sensor included in the imaging apparatus 100 according to the present exemplary embodiment, a light receiving surface, which receives light from the imaging lens 12, is consisted of light receiving surfaces A and B, as illustrated in FIG. 2B. Thus, each of the light receiving surfaces A and B can receive light from the corresponding one of different regions of an exit pupil (hereinafter referred to as pupil regions) in the imaging lens 12.

In the image sensor in the digital camera according to the present exemplary embodiment, the unit pixels are arranged in a matrix shape. The arrangement is a Bayer array having a color filter including red, green, and blue for each of the unit pixels. That is, each of the light receiving surfaces A and B receives light that has penetrated the same color filter. Thus, signals read from the pixels on the light receiving surfaces A and B can be rearranged, so as to obtain independent image data (image data 1 and image data 2). When a reading operation is controlled, image data 3 can be obtained as one pixel by combining the pixels on the left and right light receiving surfaces A and B. In the present exemplary embodiment, while each of the image data pieces is illustrated as RAW image data, which is not processed by the image processing unit 23, the image data may be compressed image data such as Joint Photographic Experts Group (jpeg) or in any other image format. However, the RAW image data is preferably a non-compressed image data or a reversibly compressed image data.

While the unit pixels are arranged in a Bayer array in the image sensor in the present exemplary embodiment, the color filter may include complementary colors such as cyan, magenta, and yellow.

Figure 8:
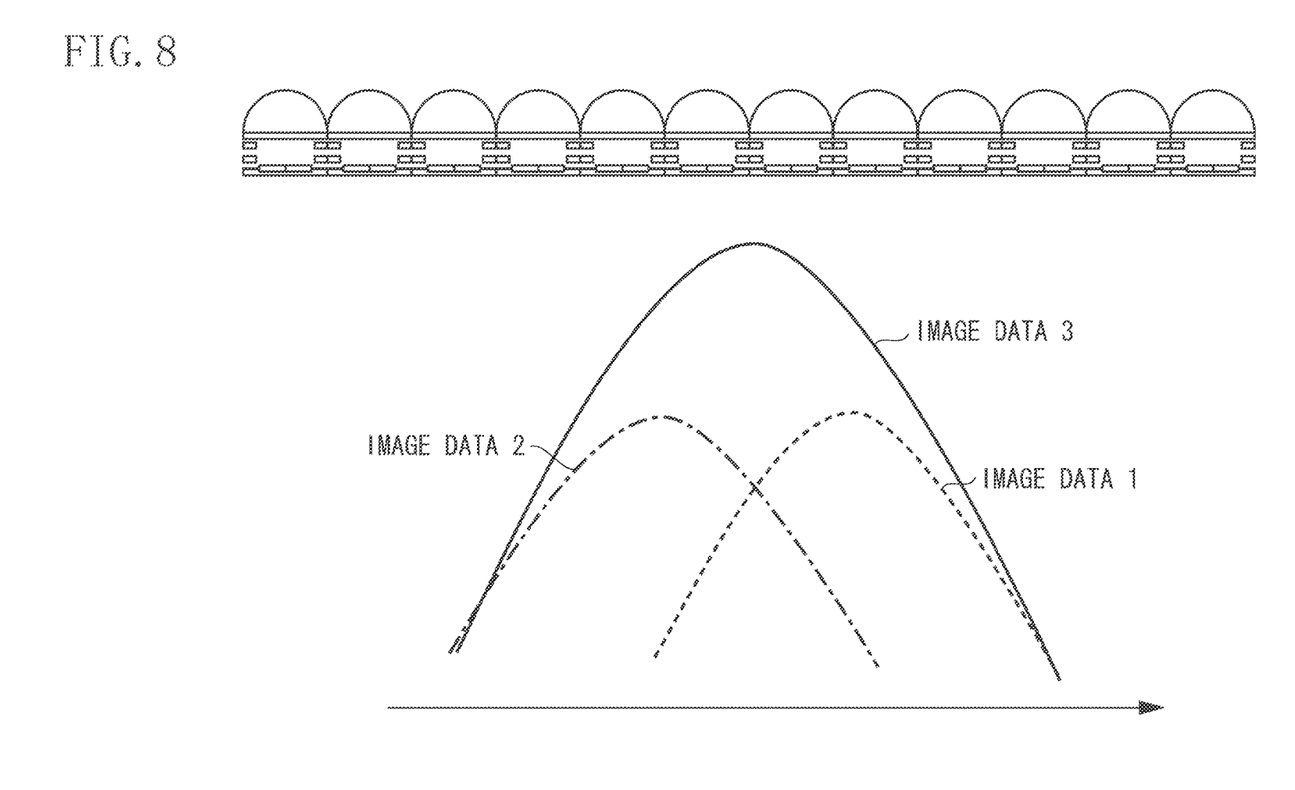
FIG. 8 is a schematic view illustrating a part of each of image data pieces when a digital camera according to an exemplary embodiment.

FIG. 8 is a schematic view illustrating a part of each of image data pieces obtained when the digital camera according to the present exemplary embodiment performs imaging. Specifically, FIG. 8 illustrates some in a predetermined row of unit pixels arranged in a matrix shape and each of image data pieces output therefrom. In a unit pixel in the image sensor in the present exemplary embodiment, the light receiving surface is consisted of plural light receiving surfaces. Therefore, a pair of object images can be obtained on the light receiving surfaces by a pair of light fluxes from different pupil regions. The pair of the object images corresponds to the image data 1 and the image data 2. Each of signal values of the image data 1 and the image data 2 represents an offset output. The offsets are based on a parallax caused when light is focused after passing through different pupil regions of an optical focusing unit. The image data 1 and the image data 2 correspond to parallax images having a parallax therebetween. The parallax between the image data 1 and the image data 2 changes depending on a focus position of the imaging lens 12. Specifically, when the imaging lens 12 is in focus, there is no parallax between the image data 1 and the image data 2. The parallax increases depending on an amount of deviation from an in-focus position. That is, a parallax amount differs depending on a focusing state. Thus, an appropriate in-focus position can be obtained and a distance to an object within the image data can be obtained, by using the parallax amount occurring between the image data pieces.

As a method for obtaining the parallax amount, a method using the following equation (1) is illustrated.

$$C(s) = \sum_{x=p}^{q} |A_x - B_{x+s}| \quad (1)$$

Ax and Bx are values of output signals from the light receiving surfaces A and B in a row designated in an image, s is a shift amount, and q and p are predetermined column numbers. More specifically, a correlation value C can be obtained by taking a difference between the value of the signal output from the light receiving surface A and a value of a signal obtained by shifting the signal output from the light receiving surface B by s pixels in a row direction. In a predetermined range, s is changed to obtain the correlation value C. A minimum value of s corresponds to a parallax amount.

While the signal from the light receiving surface B is shifted in the present exemplary embodiment, the signal from the light receiving surface A may be shifted. The parallax amount may be calculated using an equation other than the equation (1).

Thus, a distance to an object at any place within a screen can be obtained by using the image data 1 and the image data 2 generated from the signals output from the light receiving surfaces A and B that have a parallax therebetween. The image data 3 can be obtained by adding the image data 1 and the image data 2 together. That is, the image data 3 corresponds to a composite image of the image data 1 and the image data 2. While the light receiving surface is consisted of two light receiving surfaces in the present exemplary embodiment, the light receiving surface may be consisted of three or more light receiving surfaces. When the image data 1 and the image data 2 are combined to generate the image data 3, a predetermined weight may be added to the image data 1 and the image data 2. Alternatively, the image data 1 and the image data 2 may be added together after either one of the image data pieces is processed.

The digital camera 100 according to the present exemplary embodiment, when the imaging unit 21 captures an image formed via the imaging lens 12 under the control of the control unit 50, a plurality of image data pieces can be acquired. More specifically, the image data 1 and the image data 2, respectively can be acquired by reading out charges generated on the light receiving surface A and charges generated on the light receiving surface B. In addition, when the image data pieces from the light receiving surface A and the light receiving surface B are added together, the image data 3 is acquired. The order in which the image data are read out can be changed, as needed.

Each of the data pieces acquired by the imaging unit 21 is digitally converted by the A/D converter 22, is input to the image processing unit 23, or is recorded in the DRAM 24 via the memory controller 25. The data from the A/D converter 22, the data recorded in the DRAM 24 via the memory controller 25, and image processing parameters recorded in the ROM 26 are input to the image processing unit 23. Any image processing such as compression and encoding is performed. The image processing parameters recorded in the ROM 26 include a plurality of encoding parameters used for compression and encoding processing, e.g., a Huffman table. Some or all of the encoding parameters may be previously stored in the ROM 26, or may be set from the outside by the user. An image processing result serving as an output of the image processing unit 23 is recorded in the DRAM 24 via the memory controller 25. Further, data is read out of the DRAM 24 via the memory controller 25, is analog-converted by the D/A converter 27, and is periodically displayed on the display unit 13.

When the shutter button 31 is operated, the control unit 50 controls the shutter 11, the imaging lens 12, and the imaging unit 21, to perform imaging. Image processing performed by the image processing unit 23 includes distortion correction, dodging processing, image rotation, and color space conversion in addition to at least compression and encoding. The control unit 50 controls data reading and data writing from and to the DRAM 24 and the ROM 26.

A processing flow of the control unit 50 in compression and encoding of the image data during imaging according to the first exemplary embodiment will be described below with reference to FIG. 3.

Figure 3:
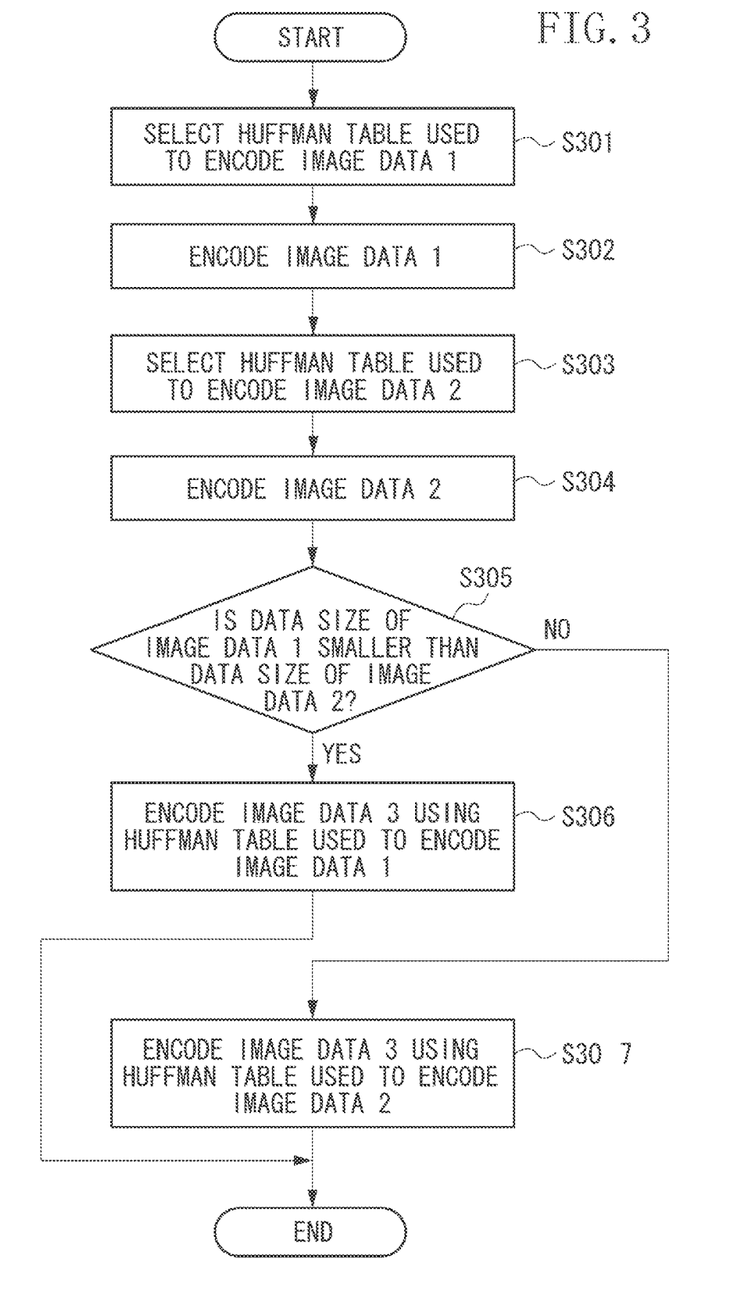
FIG. 3 is a flowchart illustrating an example of encoding processing of image data according to the first exemplary embodiment.

FIG. 3 is a flow of processing performed when the image data 1, the image data 2, and the image data 3 are compressed and encoded. The control unit 50 performs this processing. While an operation using Huffman tables as encoding parameters is illustrated, the present disclosure is not limited to this operation.

In step S301, the control unit 50 reads out a Huffman table used to encode the image data 1 from the ROM 26. Specifically, the control unit 50 selects one of a plurality of Huffman tables stored in the ROM 26 and reads out the selected Huffman table. There is no constraint on a method for selecting the Huffman table. The processing then proceeds to step S302.

In step S302, the control unit 50 causes the image processing unit 23 to encode the image data 1. The encoded image data 1 is recorded in the DRAM 24 via the memory controller 25. Specifically, the control unit 50 performs control for the image processing unit 23 to encode the image data 1 using the Huffman table read out in step S301. The control unit 50 further performs control to write out the image data 1 after compression to the DRAM 24 via the memory controller 25 or further to the recording medium 200 via the I/F 14 while acquiring size information after the compression. The image data 1 may be directly input from the A/D converter 22, or the image data 1 stored in the DRAM 24 may be read out and input via the memory controller 25. The processing then proceeds to step S303.

In step S303, the control unit 50 reads out the Huffman table used to encode the image data 2 from the ROM 26. Specifically, the control unit 50 selects, among the plurality of Huffman tables stored in the ROM 26, one of the Huffman tables that have not been read out in step S301, and reads out the selected Huffman table. There is no constraint on a method for selecting the Huffman table other than the Huffman table read out in step S301. The processing then proceeds to step S304.

In step S304, the control unit 50 causes the image processing unit 23 to encode the image data 2. The encoded image data 2 is recorded in the DRAM 24 via the memory controller 25. Specifically, the control unit 50 performs control for the image processing unit 23 to encode the image data 2 using the Huffman table read out in step S303. The control unit 50 further performs control to write out the image data 2 after compression to the DRAM 24 via the memory controller 25 or further to the recording medium 200 via the I/F 14 while acquiring size information after the compression. The image data 2 may be directly input from the A/D converter 22, or the image data 2 stored in the DRAM 24 may be read out and input via the memory controller 25. The processing then proceeds to step S305.

In step S305, the control unit 50 compares an encoding result of the image data 1 and an encoding result of the image data 2. Specifically, the control unit 50 determines whether the data size of the image data 1 encoded in step S302 is smaller than the data size of the image data 2 encoded in step S304. If the data size of the image data 1 encoded in step S302 is smaller than the data size of the image data 2 encoded in step S304 (YES in step S305), the processing proceeds to step S306. On the other hand, if the data size of the image data 1 encoded in step S302 is larger than the data size of the image data 2 encoded in step S304 (No in step S305), the processing proceeds to step S307. In the present exemplary embodiment, the control unit 50 corresponds to a determination unit that compares the encoding results and determines an encoding parameter to be used based on a comparison result.

In step S306, the control unit 50 causes the image processing unit 23 to encode the image data 3 using the Huffman table used for the encoding in step S302. Specifically, the control unit 50 performs control for the image processing unit 23 to encode the image data 3 using the Huffman table read out in step S301. Further, the control unit 50 performs control to write out the image data 3 after compression to the DRAM 24 via the memory controller 25 or further to the recording medium 200 via the I/F 14. The processing then ends.

In step S307, the control unit 50 causes the image processing unit 23 to encode the image data 3 using the Huffman table used in the encoding in step S304. Specifically, the control unit 50 performs control for the image processing unit 23 to encode the image data 3 using the Huffman table read out in step S303. Further, the control unit 50 performs control to write out the image data 3 after compression to the DRAM 24 via the memory controller 25 or further to the recording medium 200 via the I/F 14. The processing then ends.

The foregoing operation can suppress the number of times of encoding and can select the Huffman table capable of more efficiently compressing the image data 3. More specifically, in a plurality of images having a parallax therebetween obtained by imaging the same object and an image obtained by combining the plurality of images, there are many similarities. Therefore, the encoding parameter having a high compression effect obtained in any one of the images can also be effective for the other images. By determining the encoding parameter for the other image using determination results of some of the images, an entire compression time can be shortened.

The control unit 50 determines the Huffman table used to encode the image data 3 depending on which of the sizes after the compression of the image data 1 and the image data 2 is smaller in step S305. However, a method for comparing the encoding results of the image data 1 and the image data 2 is not limited to this method. For example, a processing time related to the encoding may be used, or a compression rate may be used.

Figure 7A:
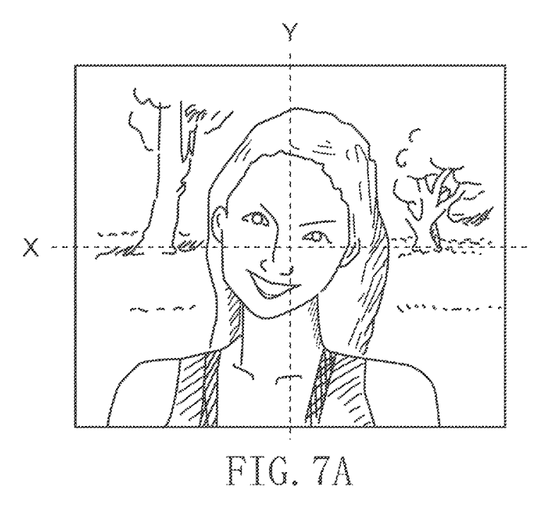
FIGS. 7A, 7B, 7C, 7D, and 7E are schematic views when image data is divided.
Figure 7B:
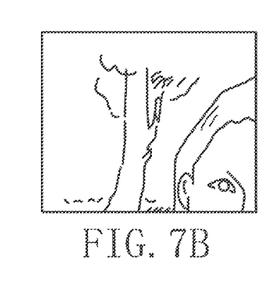
Figure 7C:
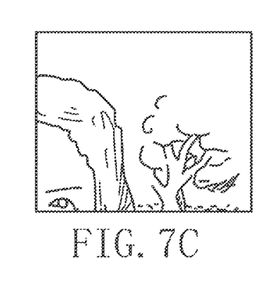
Figure 7D:
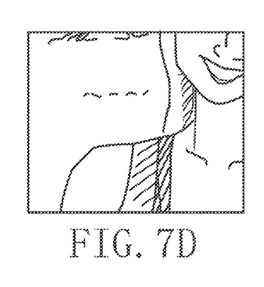
Figure 7E:
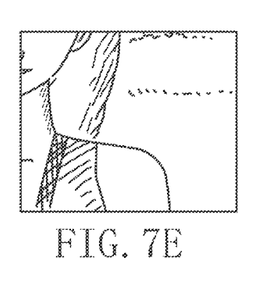

The above described processing flow is also applicable to not the parallax images but a case where the image data is divided into two or more image data pieces and is compressed and encoded for each of the image data pieces. FIGS. 7A-7E illustrate an example in which the image data is divided into four image data pieces. FIG. 7A illustrates the image data before the division, and FIGS. 7B to 7E illustrate the image data obtained by dividing the image data illustrated in FIG. 7A along broken lines X and Y illustrated in FIG. 7A. The image data illustrated in FIG. 7B, the image data illustrated in 7C, and the remaining image data illustrated in 7D and 7E, respectively are taken as image data 1, image data 2, and image data 3, to compress and encode the image data pieces. A combination of the image data pieces constituting the image data 3 is not limited to this. The processing flow may be used to compress the image data during continuous shooting or is also be applicable to a case where a dynamic range of an image is enlarged by combining one or more exposed images.

The above described processing flow is not limited to the compression and the encoding during the imaging, and is also applicable to a case where the image data stored in the recording medium 200 is read out and processed during reproduction, for example.

While the image data pieces 1 and 2 are generated from the signals acquired from the light receiving surfaces A and B, an addition result or a difference result of the signals acquired from the light receiving surfaces A and B may be image data.

Compression and encoding of image data according to a second exemplary embodiment will be described below with reference to FIGS. 4, 5, and 6. While an operation using a Huffman table as an encoding parameter is illustrated, the present disclosure is not limited to this.

Figure 4:
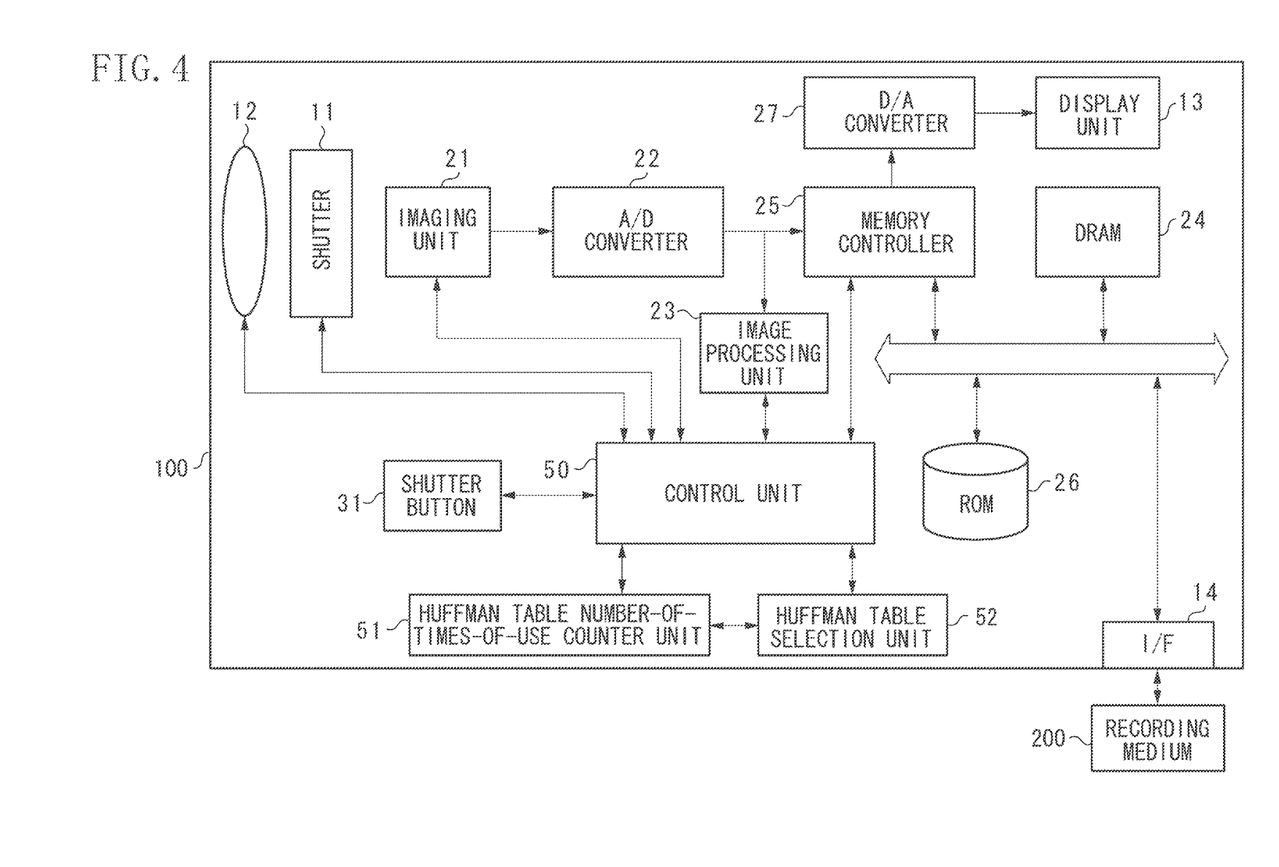
FIG. 4 illustrates a configuration of an image processing apparatus according to a second exemplary embodiment.

FIG. 4 illustrates a configuration of a digital camera according to the second exemplary embodiment. In FIG. 4, description of components similar to those in the digital camera 100 illustrated in FIG. 1 is not repeated. The digital camera 100 includes a Huffman table number-of-times-of-use counter unit 51 and a Huffman table selection unit 52. The Huffman table number-of-times-of-use counter unit 51 counts the number of times of use for compression of image data 3 for each of a plurality of Huffman tables recorded in a ROM 26. The Huffman table selection unit 52 selects the Huffman table stored in the ROM 26 depending on a count value by the Huffman table number-of-times-of-use counter unit 51. The count value may be stored in a DRAM 24 or the ROM 26.

Figure 5:
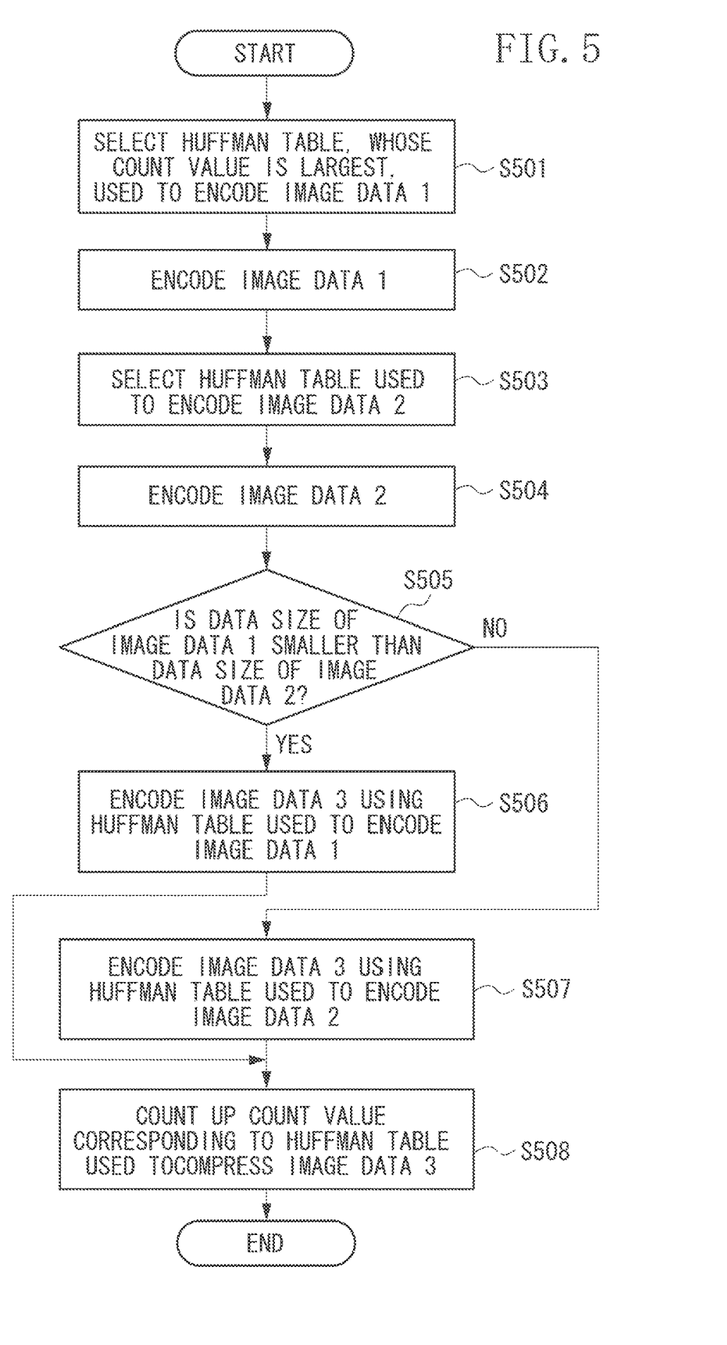
FIG. 5 illustrates an operation for selecting an encoding parameter by the image processing apparatus according to the second exemplary embodiment.

FIG. 5 is a processing flow according to the second exemplary embodiment when image data 1, image data 2, and image data 3 are compressed and encoded. A control unit 50 performs this processing.

In step S501, the control unit 50 selects the Huffman table, whose count value by the Huffman table number-of-times-of-use counter unit 51 is the largest, and reads out the selected Huffman table from the ROM 26. Specifically, the control unit 50 selects one of the plurality of Huffman tables stored in the ROM 26 and reads out the selected Huffman table. It is assumed that in the count values by the Huffman table number-of-times-of-use counter unit 51, the count values do not differ for each of the Huffman tables. In this case, one of the plurality of Huffman tables is selected. For example, the lower-numbered Huffman table is selected. Alternatively, the unused Huffman table is selected. The processing then processed to step S502.

In step S502, the control unit 50 causes an image processing unit 23 to encode the image data 1 using the Huffman table selected in step S501. The encoded image data 1 is recorded in the DRAM 24 via the memory controller 25. Specifically, the control unit 50 performs control for the image processing unit 23 to encode the image data 1 using the Huffman table read out in step S501. Further, the control unit 50 performs control to write out the image data 1 after compression to the DRAM 24 via the memory controller 25 or further to the recording medium 200 via the I/F 14 while acquiring size information after the compression. The image data 1 may be directly input from the A/D converter 22, or the image data 1 stored in the DRAM 24 may be read out and input via the memory controller 25. The processing then proceeds to step S503.

In step S503, the control unit 50 selects the Huffman table other than the Huffman table selected in step S501, and reads out the selected Huffman table from the ROM 26. Specifically, the control unit 50 selects one of the Huffman tables that have not been read out in step S501 among the plurality of Huffman tables stored in the ROM 26, and reads out the selected Huffman table. There is no constraint on a method for selecting the Huffman table other than the Huffman table read out in step S501. The processing then proceeds to step S504.

In step S504, the control unit 50 causes the image processing unit 23 to encode the image data 2 using the Huffman table selected in step S503. The encoded image data 2 is recorded in the DRAM 24 via the memory controller 25. Specifically, the control unit 50 performs control for the image processing unit 23 to encode the image data 2 using the Huffman table read out in step S503. Further, the control unit 50 performs control to write out the image data 2 after compression to the DRAM 24 via the memory control 25 or further to the recording medium 200 via the I/F 14 while acquiring size information after the compression. The image data 2 may be directly input from the A/D converter 22, or the image data 2 stored in the DRAM 24 may be read out and input via the memory controller 25. The processing then proceeds to step S505.

In step S505, the control unit 50 compares an encoding result of the image data 1 and an encoding result of the image data 2. Specifically, the control unit 50 determines whether the data size of the image data 1 encoded in step S502 is smaller than the data size of the image data 2 encoded in step S504. If the data size of the image data 1 encoded in step S502 is smaller than the data size of the image data 2 encoded in step S504 (YES in step S505), the processing proceeds to step S506. On the other hand, if the data size of the image data encoded in step S502 is larger than the data size of the image data encoded in step S504 (NO in step S505), the processing proceeds to step S507.

In step S506, the control unit 50 causes the image processing unit 23 to encode the image data 3 using the Huffman table selected in step S501. Specifically, the control unit 50 performs control for the image processing unit 23 to encode the image data 3 using the Huffman table read out in step S501. Further, the control unit 50 performs control to write out the image data 3 after compression to the DRAM 24 via the memory controller 25 or further to the recording medium 200 via the I/F 14. The processing then proceeds to step S508.

In step S507, the control unit 50 causes the image processing unit 23 to encode the image data 3 using the Huffman table selected in step S503. Specifically, the control unit 50 performs control for the image processing unit 23 to encode the image data 3 using the Huffman table read out in step S503. Further, the control unit 50 performs control to write out the image data 3 after compression to the DRAM 24 via the memory controller 25 or further to the recording medium 200 via the I/F 14. The processing then proceeds to step S508.

In step S508, the control unit 50 counts up the count value corresponding to the Huffman table used to compress the image data 3 for the Huffman table number-of-times-of-use counter unit 51. The processing then ends.

Figure 6:
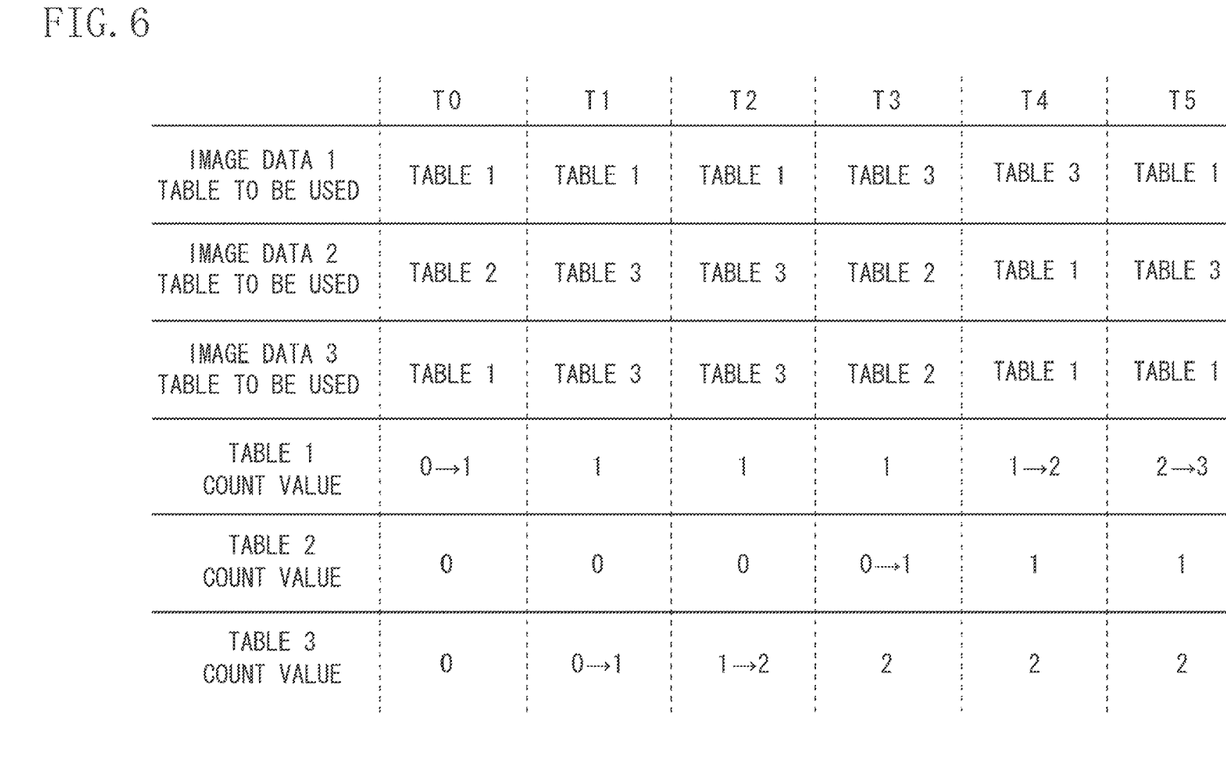
FIG. 6 illustrates an example of Huffman table selection by the image processing apparatus according to the second exemplary embodiment.

FIG. 6 illustrates an example of Huffman table selection when the number of Huffman tables recorded in the ROM 26 is three (Table 1, Table 2, and Table 3). FIG. 6 illustrates values of the Huffman table number-of-times-of-use counter unit 51 when the imaging unit 21 performs imaging once each time at times T0 to T5, starting at the time T0, and a Huffman table selection result by the Huffman table selection unit 52. More specifically, the processing in the flowchart illustrated in FIG. 5 is performed at each of the times T0 to T5, to perform an operation for continuously acquiring images. At least three image data can be acquired by performing imaging once.

An operation performed when the image data 1, the image data 2, and the image data 3 are compressed and encoded according to the flowchart illustrated in FIG. 5 and the Huffman table selection result illustrated in FIG. 6 will be described below.

In the compression and encoding in the imaging at the time T0, all count values by the Huffman table number-of-times-of-use counter unit 51 are zero. In step S501, it is assumed that the control unit 50 causes the Huffman table selection unit 52 to select the lowest-numbered table, i.e., Table 1.

In step S503, it is assumed that the control unit 50 causes the Huffman table selection unit 52 to select the lower-numbered table, i.e., Table 2.

In step S505, the control unit 50 determines that a compression result of the image data 1 becomes smaller than a compression result of the image data 2, and the processing proceeds to step S506. In step S506, the control unit 50 encodes the image data 3 using Table 1.

In step S508, the control unit 50 further updates the count value of Table 1 by the Huffman table number-of-times-of-use counter unit 51 from zero to one.

In the encoding and encoding in the imaging at the time T1, the count value of Table 1 by the Huffman table number-of-times-of-use counter unit 51 is one. Therefore, in step S501, the control unit 50 causes the Huffman table selection unit 52 to select Table 1 depending on the count value by the Huffman table number-of-times-of-use counter unit 51. In step S503, the control unit 50 causes the Huffman table selection unit 52 to select one of Table 2 and Table 3 that have not been selected in step S501. It is assumed that the Huffman table selection unit 52 has selected Table 3 that has not yet been used. In step S505, the control unit 50 determines that the compression result of the image data 2 becomes smaller than the compression result of the image data 1, and the processing proceeds to step S507. In step S507, the control unit 50 encodes the image data 3 using Table 3. Further, in step S508, the control unit 50 updates the count value of Table 3 by the Huffman table number-of-times-of-use counter unit 51 from zero to one.

In the compression and encoding in the imaging at the time T2, the respective count values of Table 1 and Table 3 by the Huffman table number-of-times-of-use counter unit 51 are one. In step S501, the control unit 50 causes the Huffman table selection unit 52 to select one of Table and Table 3 whose count values by the Huffman table number-of-times-of-use counter unit 51 are one. It is assumed that the Huffman table selection unit 52 has selected Table 1. In step S503, the control unit 50 causes the Huffman table selection unit 52 to select Table 3. The Huffman table selection unit 52 may select the Huffman table depending on the count value by the Huffman table number-of-times-of-use counter unit 51. In step S507, the control unit 50 causes the image processing unit 23 to encode the image data 3 using Table 3. Further, in step S508, the control unit 50 updates the count value of Table 3 by the Huffman table number-of-times-of-use counter unit 51 from one to two.

In the compression and encoding in the imaging at the time T3, the control unit 50 select Table 3 in step S501 and selects Table 2 in step S503, to encode the image data 1 and the image data 2. In step S505, if the control unit 50 determines that data size of the image data 2 is smaller than that of the image data 1, the processing proceeds to step S507. In step S508, the control unit 50 updates the count value of Table 2 by the Huffman table number-of-times-of-use counter unit 51 from zero to one.

In the compression and encoding in the imaging at the time T4, the control unit 50 selects Table 3 in step S501 and selects Table 1 in step S503, to encode the image data 1 and the image data 2. In step S505, if the control unit 50 determines that data size of the image data 2 is smaller than that of the image data 1, the processing proceeds to step S507. In step S508, the control unit 50 updates the count value of Table 1 by the Huffman table number-of-times-of-use counter unit 51 from one to two.

In the compression and encoding in the imaging at the time T5, the control unit 50 selects Table 1 in step S501 and selects Table 3 in step S503, to encode the image data 1 and the image data 2. In step S505, if the control unit 50 determines that data size of the image data 1 is smaller than that of the image data 2, the processing proceeds to step S506. In step S508, the control unit 50 updates the count value of Table 1 by the Huffman table number-of-times-of-use counter unit 51 from two to three.

In the following imaging, the control unit 50 repeatedly selects the Huffman table in steps S501 and S503 based on the count value by the Huffman table number-of-times-of-use counter unit 51 and updates the count value by the Huffman table number-of-times-of-use counter unit 51 in step S508.

Thus, the Huffman table, which can be more efficiently compressed, can also be preferentially selected in the encoding of the image data 1 and the image data 2.

While the number of Huffman tables recorded in the ROM 26 is three in the present exemplary embodiment, this is not seen to be limiting. The Huffman table number-of-times-of-use counter unit 51 can be initialized, as needed, when the power to the camera is turned off or in response to an instruction from the user. Further, an initial value of the Huffman table number-of-times-of-use counter unit 51 may be zero, or may be any value previously set for each of the Huffman tables.

The above described processing flow is also applicable to a case where image data is divided into units and is compressed and encoded for each of the units. If the image data is divided into three image data pieces, for example, the three image data pieces are taken as image data 1, image data 2, and image data 3, to compress and encode the image data. If the image data is divided into four image data pieces, two of the image data pieces are taken as image data 1 and image data 2, and the remaining two image data pieces are taken as image data 3, to compress and encode the image data.

The above described processing flow is applicable to not only compression and encoding during imaging but also a case where image data temporarily recorded in the RAM 24 is read out and processed and a case where image data stored in the recording medium 200 is read out and processed.

While exemplary embodiments have been described above, they are not seen to be limiting. Various modifications and alterations can be made without departing from the scope of the present disclosure.

Other Embodiments

Additional exemplary embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting.

This application claims the benefit of Japanese Patent Application No. 2014-149918, filed Jul. 23, 2014, which is hereby incorporated by reference herein in its entirety.

What is claimed is:

1. An image processing apparatus comprising:
   one or more processors; and at least one memory storing a program which, when executed by the one or more processors, causes the image processing apparatus to:

perform a first processing for image-processing a plurality of first image data, each corresponding to different areas of an image sensor, based on respectively different image processing parameters;

compare processing results of the plurality of first image data processed by the first processing, with each other;

select, from the different image processing parameters, one of the image processing parameters based on a comparison result; and perform a second processing for image-processing second image data based on the selected image processing parameter, wherein the second image data is obtained by combining a plurality of first image data together or obtained from an area other than the areas from where the plurality of first image data has been obtained.

2. The image processing apparatus according to claim 1, wherein the processing parameters include encoding parameters for encoding image data, and wherein the first processing and the second processing are encoding processing using the encoding parameters.

3. The image processing apparatus according to claim 1, wherein the plurality of first image data to be image-processed by the first processing corresponds to images having parallax therebetween.

4. The image processing apparatus according to claim 3, wherein the second image data to be image-processed by the second processing includes a composite image obtained by combining the plurality of first image data that corresponds to images having parallax therebetween.

5. The image processing apparatus according to claim 1, wherein the plurality of first image data to be image-processed by the first processing corresponds to at least two divided images consisting of one frame image.

6. The image processing apparatus according to claim 5, wherein the second image data to be image-processed by the second processing corresponding to the one frame.

7. The image processing apparatus according to claim 1, wherein the program further causes the image processing apparatus to compare at least one of a data size, a compression rate, or a processing time of image data, of the processing results of the plurality of first image data with reference values.

8. The image processing apparatus according to claim 1, wherein the program further causes the image processing apparatus to store the determined image processing parameters and select an image processing parameter to be used for at least one of the second processing and the first processing from the stored image processing parameters.

9. The image processing apparatus according to claim 8, wherein the program further causes the image processing apparatus to count the number of times of storing the determined image processing parameters.

10. The image processing apparatus according to claim 9, wherein the program further causes the image processing apparatus to select the image processing parameter to be used for at least one of the second processing and the first processing based on the number of times of storing the determined image processing parameters.

11. A method for controlling an image processing apparatus, the method comprising:

storing a plurality of image processing parameters;

performing a first processing for image-processing a plurality of first image data, each corresponding to different areas of an image sensor, based on respectively different image processing parameters;

comparing processing results of the plurality of first image data processed by the first processing, with each other;

selecting, from the different image processing parameters, one of the processing parameters based on a comparison result;

generating a second image data by combining a plurality of first image data together or obtaining from an area other than the areas from where the plurality of first image data has been obtained; and performing a second processing for image-processing the second image data based on the selected image processing parameter.

wherein the second image data is obtained by combining a plurality of first image data.

12. A non-transitory computer-readable storage medium storing computer-executable instructions for causing a computer to perform a method for controlling an image processing apparatus, the method comprising:

storing a plurality of image processing parameters;

performing a first processing for image-processing a plurality of first image data, each corresponding to different areas of an image sensor, based on respectively different image processing parameters;

comparing processing results of the plurality of first image data processed by the first processing, with each other;

selecting, from the different image processing parameters, one of the processing parameters based on a comparison result;

generating a second image data by combining a plurality of first image data together or obtaining from an area than the areas from where the plurality of first image data has been obtained; and performing a second processing for image-processing the second image data based on the selected image processing parameter.

wherein the second image data is obtained by combining a plurality of first image data.

\* \* \* \* \*